United States Patent
Ranganathan et al.

(10) Patent No.: US 12,367,486 B2
(45) Date of Patent: Jul. 22, 2025

(54) SYSTEMS AND METHODS FOR TWO-WAY ACCOUNT ONBOARDING AND LINKING ACROSS MULTIPLE SERVICE PROVIDERS

(71) Applicant: PAYPAL, INC., San Jose, CA (US)

(72) Inventors: Aravindan Ranganathan, San Jose, CA (US); Madan Ranganath, Bangalore (IN); Satya Malla Venkata, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 287 days.

(21) Appl. No.: 18/298,874

(22) Filed: Apr. 11, 2023

(65) Prior Publication Data

US 2023/0306417 A1    Sep. 28, 2023

Related U.S. Application Data

(63) Continuation of application No. 16/521,971, filed on Jul. 25, 2019, now Pat. No. 11,699,150.

(51) Int. Cl.
  *G06Q 20/38* (2012.01)
  *G06F 9/451* (2018.01)
  *H04L 9/40* (2022.01)

(52) U.S. Cl.
  CPC ......... *G06Q 20/3821* (2013.01); *G06F 9/451* (2018.02); *H04L 63/0815* (2013.01); *H04L 63/102* (2013.01)

(58) Field of Classification Search
  CPC .... G06Q 20/3821; G06Q 20/10; G06F 9/451; H04L 63/0815; H04L 63/102
  USPC ........................................................ 705/44
  See application file for complete search history.

(56) References Cited

U.S. PATENT DOCUMENTS

| | | |
|---|---|---|
| 2006/0236382 A1 | 10/2006 | Hinton et al. |
| 2008/0134295 A1 | 6/2008 | Bailey et al. |
| 2011/0239278 A1 | 9/2011 | Downey et al. |
| 2012/0227098 A1 | 9/2012 | Obasanjo et al. |
| 2013/0086645 A1 | 4/2013 | Srinivasan et al. |
| 2016/0203213 A1 | 7/2016 | Lewis et al. |
| 2017/0070500 A1 | 3/2017 | Hockey et al. |
| 2017/0147808 A1 | 5/2017 | Kravitz |
| 2017/0331829 A1 | 11/2017 | Lander et al. |
| 2019/0205885 A1 | 7/2019 | Lim et al. |

(Continued)

OTHER PUBLICATIONS

International Appl. No. PCT/US2020/043591, International Search Report and Written Opinion mailed Oct. 16, 2020, 14 Pages.

(Continued)

*Primary Examiner* — Lindsay M Maguire
(74) *Attorney, Agent, or Firm* — .Haynes and Boone, LLP

(57) ABSTRACT

Methods and systems for facilitating a two-way user accounts onboarding and linking across multiple service providers are presented. Upon logging in a user device to a first user account of a first service provider, a first user interface associated with the first service provider is provided on the user device. Through the first user interface, a user of the user device may request creating a second user account with a second service provider. The first service provider may then exchange access tokens and refresh tokens with the second service provider to link the first user account with the second user account. After the linking, the first service provider may configure the first user interface to provide the user access to the second user account without requiring the user to log in to the second user account.

20 Claims, 6 Drawing Sheets

(56) References Cited

U.S. PATENT DOCUMENTS

2019/0318122 A1 10/2019 Hockey et al.

OTHER PUBLICATIONS

International Preliminary Report on Patentability for Application No. PCT/US2020/043591 mailed on Feb. 3, 2016, 7 pages.
Wang R., et al., "Signing Me onto Your Accounts through Facebook and Google: A Traffic-Guided Security Study of Commercially Deployed Single-Sign-on Web Services", IEEE, 2012, retrieved on [Sep. 27, 2020], Retrieved from the internet URL: http://www.ieee-security.org/TC/SP2012/papers/4681a365.pdf entire document, 15 pages.

SYSTEMS AND METHODS FOR TWO-WAY ACCOUNT ONBOARDING AND LINKING ACROSS MULTIPLE SERVICE PROVIDERS

CROSS REFERENCE TO RELATED APPLICATION

The present invention is a Continuation of U.S. patent application Ser. No. 16/521,971, filed Jul. 25, 2019, which is incorporated herein by reference in its entirety.

BACKGROUND

The present specification generally relates to online account onboarding and linking, and more specifically, to linking online accounts from different online service providers according to various embodiments of the disclosure.

RELATED ART

The rise of the Internet and mobile technologies have enabled users to access information and perform transactions anytime and anywhere. For example, a user can register online accounts with various entities (e.g., merchants, banks, e-mail service providers, and other electronic service providers alike) by providing information of the user (e.g., name, gender, age, etc.). The user can then access the different online accounts of the entities using the corresponding credentials (e.g., usernames and passwords) to perform services and view content provided by the entities.

However, as increasingly more electronic services are being offered online by different entities, the need for a user to register additional accounts also increases. Since different entities usually require similar information of the user for registering a new account, it might become burdensome for the user to repetitively provide the same kind of information to different entities during the registration processes. Furthermore, the user is usually required to log in to each individual account (by providing the corresponding credentials) separately to access information of the different accounts. Thus, when the user wants to view information from multiple accounts (e.g., viewing the financial information from different bank accounts with different banking entities, etc.), the user has to log in to the different accounts and may have to view the information of the different accounts via different interfaces (e.g., different browser windows, different applications, etc.) provided by the different entities. This involves the user having to switch between various interfaces, such as minimizing or closing an interface and maximizing or opening another interface. Alternatively, a user may have multiple interfaces shown on a display, such as in a split screen mode. However, this may not be practical with computing devices with smaller screen sizes or with interfaces that provide a lot of content, as the content may be too small for the user to use or interact with.

Thus, there is a need for providing a mechanism for linking multiple accounts to provide a centralized interface for accessing the multiple accounts.

Figure 1:
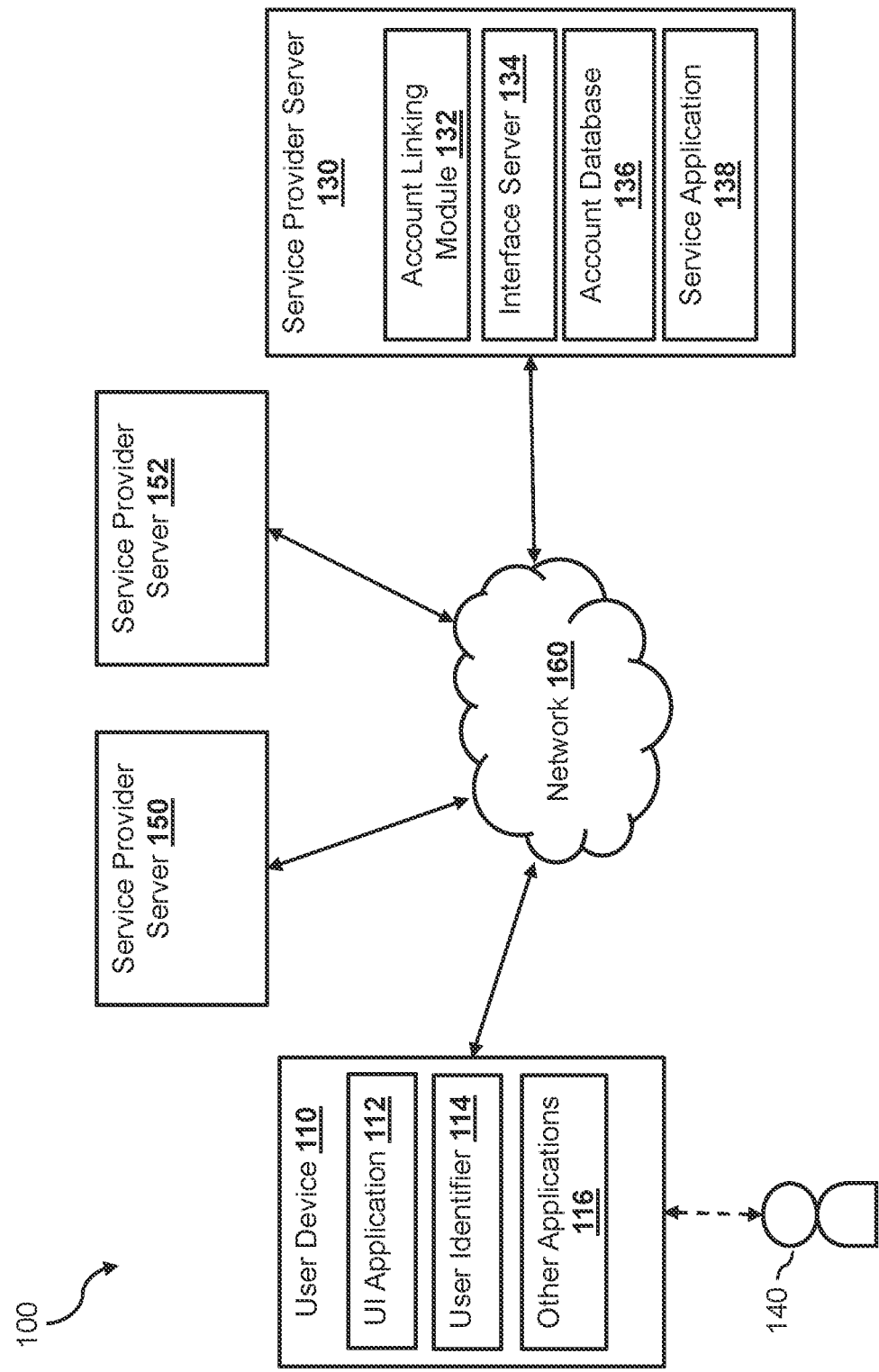
FIG. 1 is a block diagram illustrating a user account onboarding and linking system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating two-way user account onboarding and linking across multiple service providers. As discussed above, a user may register a user account (e.g., a first user account) with a first service provider (e.g., a payment service provider such as PayPal®, Inc., of San Jose, California, USA, a bank, a social network platform, an e-mail service provider, an online merchant, etc.). For example, the user may complete a registration process of the first service provider by providing, using a user device, information of the user (e.g., a name, an age, a gender, an address, etc.). In some embodiments, the first service provider offers various services to the user, including an identity service by associating an identity (e.g., a user name, a user identifier, etc.) with the first user account, where the identity is based on the information that the user provides during the registration process and any subsequent interaction of the user with the first user account. Once the user has created the first user account with the first service provider through the completion of the registration process, the first service provider may provide, on the user device or a different computing device of the user, a first user interface (e.g., a home webpage of the first user account, etc.) that enables the user to access the first user account. In some embodiments, the first service provider may provide the user access to the first user account after authenticating the user (e.g., verifying that the user matches the identity associated with the first user account).

In some embodiments, in addition to enabling the user to access the first user account, an account linking system of the first service provider may configure the first user interface to enable the user to initiate a registration of a second user account with a second service provider (e.g., different from the first service provider). For example, the account linking system may present, on the first user interface, a selectable interface element (e.g., a button) for initiating a registration of the second user account with the second service provider. When the user selects the selectable interface element, the account linking system may transmit a request to the second service provider for creating the second user account (e.g., an onboarding request), and may redirect the user to a second user interface associated with the second service provider (e.g., a registration webpage of the second service provider) to create the second user account.

In some embodiments, the account linking system may also transmit, in addition to the request or as part of the request, at least a portion of information associated with the first user account (e.g., name, age, gender, address, and other information that is common to both the first user account and the second user account) to the second service provider, such that the identity associated with the first user account is also associated with the second user account. Thus, the second service provider may use the received information to either skip (e.g., bypass) one or more sub-processes of the registration process or prefill at least a portion of the registration interface, such that the user is not burdened with providing the same information that he or she provided to other service providers (e.g., the first service provider) during the registration process of the second user account. Once the registration process of the second service provider is complete, the second service provider may redirect the user back to the first user interface provided by the first service provider. In some embodiments, the second service provider may provide the user access to the second user account after authenticating the user (e.g., verifying that the user matches the identity associated with the second user account).

In addition to providing an onboarding service for a different service provider, the account linking system of different embodiments may also provide two-way linking between user accounts across different service providers. For example, the account linking system may link the first user account (with the first service provider) with the second user account (with the second service provider). The linking between the first and second user accounts enables the first service provider (and/or the second service provider) to provide the user access to both the first user account and the second user account via a common user interface (e.g., the first user interface provided by the first service provider), after authenticating the user (e.g., verifying that the user matches the identity associated with the first user account).

Different embodiments may use different techniques to implement the linking of different user accounts across different service providers. In some embodiments, the account linking system of the first service provider may perform an access token exchange (e.g., a refresh to access token exchange) with the second service provider to link the first user account with the second user account. In some embodiments, the account linking system may generate a first account access token for accessing the first user account. For example, the account linking system may generate the first account access token based on an identifier (e.g., an account number, a user name, etc.) and/or a credential (e.g., a password) associated with the first user account. In a non-limiting example, the first account access token may be a hash value generated based on hashing the identifier and/or the credential. In another example, the first account access token is generated by encrypting the identifier and/or the credential using one or more encryption algorithms. The account linking system may transmit the first account access token to the second service provider.

Using the first account access token, the second service provider may provide the user access to the first user account (e.g., data and functions associated with the first user account). For example, the account linking system may receive, from the second service provider, a request for accessing the first user account (e.g., via an application programming interface (API) call associated with the first service provider). The request may include a request for accessing the data associated with the first user account, a request for accessing a function that the user may initiate through the first user account, or any other type of request related to the first user account. Upon receiving the request, the account linking system may determine whether the request includes an access token. The account linking system may determine whether the access token included in the request matches the access token generated for the first user account. In some embodiments, the account linking system may also extract information from the access token to determine if it includes the correct credentials for accessing the first user account. As discussed above, the first account access token may be generated based on the identifier and/or the credentials (e.g., the password) of the first user account. Thus, the account linking system may extract the identifier and/or the credential from the access token included in the request from the second service provider, and determine that the identifier and/or the credential extracted from the received token matches the identifier and/or the credential associated with the first user account. If it is determined that the access token included in the request matches the access token generated for the first user account, the account linking system may provide the second service provider access to the first user account. As such, the second service provider may enable, via the second user interface, the user to access the data and function(s) associated with the first user account, without requiring the user to separately log in to the first user account with the first service provider.

The account linking system may receive a second account access token from the second service provider for accessing the second user account. The account linking system may store the second account access token in a non-transitory data storage in association with the data associated with the first user account, such that the account linking system may retrieve the second account access token when the first user account is accessed (e.g., when the user logs in to the first user account). The account linking system may also configure the first user interface to provide the user access to the second user account. For example, using the second account access token, the account linking system may retrieve, from the second service provider, data associated with the second user account (e.g., by making a request via an API call associated with the second service provider). The account linking system may then present, on the first user interface, the retrieved data associated with the second user account. In some embodiments, the account linking system may format the data associated with the second user account according to a data format associated with the first user interface before presenting the data associated with the second user account on the first user interface, such that the data associated with the second user account is presented in a consistent manner as the rest of the first user interface.

In some embodiments, in addition to presenting the data associated with the second user account, the account linking system may also determine a set of functions (e.g., transaction requests, etc.) that the user may initiate through the second user account with the second service provider, for example, through a set of API calls associated with the second service provider. The account linking system may then present, on the first user interface, one or more selectable interface elements for initiating the set of functions. When the account linking system detects that one of the one or more selectable interface elements is selected by the user, the account linking system may transmit, to the second service provider, a request for performing the corresponding function for the second user account, where the request may include the second account access token. Thus, the user may access the first user account (e.g., the data and functions associated with the first user account) and the second user account (e.g., the data and functions associated with the second user account) via the first user interface without separately logging in to the second user account with the second service provider.

After the first user account is linked with the second user account, the account linking system may determine additional functions that the user may initiate (different from the functions that the user may initiate individually with the first user account or the second user account). For example, the additional functions may correspond to transactions that involve both the first user account and the second user account, such as a fund transfer transaction between the first and second user accounts or performing a transaction through the second user account using funds from the first user account. The account linking system may then present, on the first user interface, additional selectable interface elements for initiating the additional functions. Thus, by logging in to the first user account (and without logging in to the second user account), the user may initiate a transaction that involves both the first user account and the second user account via the first user interface provided by the first service provider. For example, the user may initiate a fund transfer from the second user account to the first user account. Upon detecting a selection of the selectable interface element corresponding to the transaction that involves the first and second user accounts, the account linking system may transmit a request for initiating the transaction to the second service provider, where the request includes the second account access token. Based on the second account access token, the second service provider may perform the transaction (e.g., the funds transfer transaction). Thus, the linking between the first user account and the second user account using the token exchange techniques disclosed herein enables the user to view data and initiate transactions associated with both the first and second user accounts on a common user interface, and without requiring the user to log in to different user accounts separately.

Using the token exchange techniques described herein, the account linking system may link the first user account with multiple accounts with different service providers. For example, in addition to linking the first user account with the second user account, the account linking system may also link the first user account with a third user account of the user associated with a third service provider. In some embodiments, the account linking system may exchange account access tokens with the third service provider, for example, by transmitting the first account access token to the third service provider and receiving a third account access token from the third service provider for accessing the third user account. The account linking system may provide, via the first user interface, the user access to the first user account, the second user account, and the third user account by using the second account access token and the third account access token. In addition, based on the linking with the second and third user accounts, the account linking system may determine additional functions (e.g., transactions) that involve the second and third user accounts, such as a funds transfer transaction between the second user account and the third user account.

The account linking system may then present, on the first user interface, additional selectable interface elements for initiating the additional functions that involve the second and third user accounts. Thus, by logging in to the first user account (and without logging in to the second user account and/or the third user account), the user may initiate a transaction that involves both the second user account and the third user account via the first user interface provided by the first service provider. For example, the user may initiate a fund transfer from the third user account to the second user account. In another example, the user may initiate a transaction through the second user account using funds from the third user account. Upon detecting a selection of the selectable interface element corresponding to the transaction that involves the second and third user accounts, the account linking system may transmit one or more requests for initiating the transaction to the second service provider and/or the third service provider, where the one or more requests include the second account access token and/or the third account access token. Based on the second and third account access tokens, the second service provider and/or the third service provider may perform the transaction.

FIG. 1 illustrates a system 100 in which the account linking system may be implemented according to one embodiment of the disclosure. The system 100 includes a user device 110 and service provider servers 130, 150, and 152 that may be communicatively coupled with each other via a network 160. Each of the service provider servers 130, 150, and 152 may be associated with a different service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider servers 130, 150, and 152, and/or other user devices similar to the user device 110 over the network 160. For example, the user 140 may use the user device 110 to log in to one or more user accounts with the service providers to access account services or conduct electronic transactions (e.g., account transfers or payments, purchase goods and/or services, sales of goods and/or services, receive payments of the sale, view content, etc.) with the service provider servers 130, 150, and 152. Furthermore, the user 140 represented here may be a natural person, a group of people, a community, and/or a business entity or even a bot. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to conduct electronic transactions (e.g., electronic payment transactions, funds transfer transactions, electronic banking transactions, social media transactions such as posting messages and/or multi-media, selling, shopping, purchasing, bidding, etc.) with the service provider servers 130, 150, and 152 over the network 160. In one aspect, each user account associated with the service provider servers 130, 150, and/or 152 may include a funding account having a monetary balance. As such, funds may be withdrawn from or deposited into the funding account based on transactions that involve the user account.

In one implementation, the user interface application 112 includes a software program (e.g., a mobile application associated with one or more of the service provider servers 130, 150, and 152) executable by a processor that is configured to interface and communicate with the service provider servers 130, 150, and/or 152 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, and may be included in communication with the service providers 130, 150, and 152, such that the service provider servers 130, 150, and 152 may identify the user (e.g., and the associated user accounts) based on the communication.

In various implementations, the user 140 is able to input data and information into an input component (e.g., a keyboard) of the user device 110 to provide user information and or input signals (e.g., initiating a transaction request such as a login request, a fund transfer request, a request for adding an additional funding source (e.g., a new credit card), or other types of request) to the service provider servers 130, 150, and/or 152.

Even though only one user device 110 is shown in FIG. 1, it has been contemplated that one or more user devices (each similar to user device 110) may be communicatively coupled with the service provider server 130 via the network 160 within the system 100.

The service provider server 130, in various embodiments, may be implemented using any appropriate combination of hardware and/or software configured for wired and/or wireless communication over the network 160. In various implementations, the service provider server may include at least one of a computer server, a PC, a laptop, a virtual machine, etc.

The service provider server 130, in one embodiment, may be maintained by an online service provider, which may provide services (e.g., selling of merchandise processing, performing electronic transactions such as payment transactions, funds transfer transactions, etc.). As such, the service provider server 130 may include a service application 138, which may be adapted to interact with the user devices (such as the user device 110) to facilitate one or more of transactions through the user account of the user 140. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content and/or a user interface for the user. The interface server 134 may include a web server and/or an application server. For example, the web server may be configured to communicate with a web browser running on the user device 110 over an HTTP protocol. The web server may serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. The application server may be configured to communicate with an application (e.g., a mobile application) running on the user device 110 over a mobile communication protocol (e.g., a representational state transfer (REST) protocol). The application server may serve content and provide a user interface on the mobile application of the user device 110. As a result, a user may access a user account associated with the user with the service provider server 130 and access various services offered by the service provider server 130, by generating requests (e.g., HTTP requests, REST requests, etc.) directed at the interface server 134 of the service provider server 130.

The service provider server 130, in one embodiment, may be configured to maintain one or more user accounts in an account database 136, each of which may include account information associated with one or more users (e.g., the user 140 associated with user device 110). For example, account information may include personal information such as a name, an age, a gender, an address, private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials (e.g., a password, a fingerprint, an iris scan, etc.) to authenticate or verify identity with the service provider server 130. User attributes may include personal information, banking information and/or funding sources. In various aspects, the user attributes may be passed to the service provider server 130 as part of a transaction request (e.g., a login request, a search request, a funds transfer request, a payment request, etc.), and the user attributes may be utilized by the service provider server 130 to associate the user with one or more particular user accounts maintained by the service provider server 130.

The service provider server 130 may also include an account linking module 132 that implements the account linking system as disclosed herein. In some embodiments, the account linking module 132 may configure the user interface generated by the interface server 134, to enable the user 140 to register and/or link with user accounts with other service provider servers (e.g., the service provider servers 150 and 152), such that the user 140 may access, through the user interface provided by the service provider server 130, the user accounts of the user 140 with the other service provider servers 150 and/or 152.

Each of the service provider servers 150 and 152 may be implemented in a similar manner as the service provider server 130. As such, each of the service provider server 150 and 152 may manage one or more user accounts and provide the user 140 access to user accounts of the user 140 with the respective service provider server.

Figure 2:
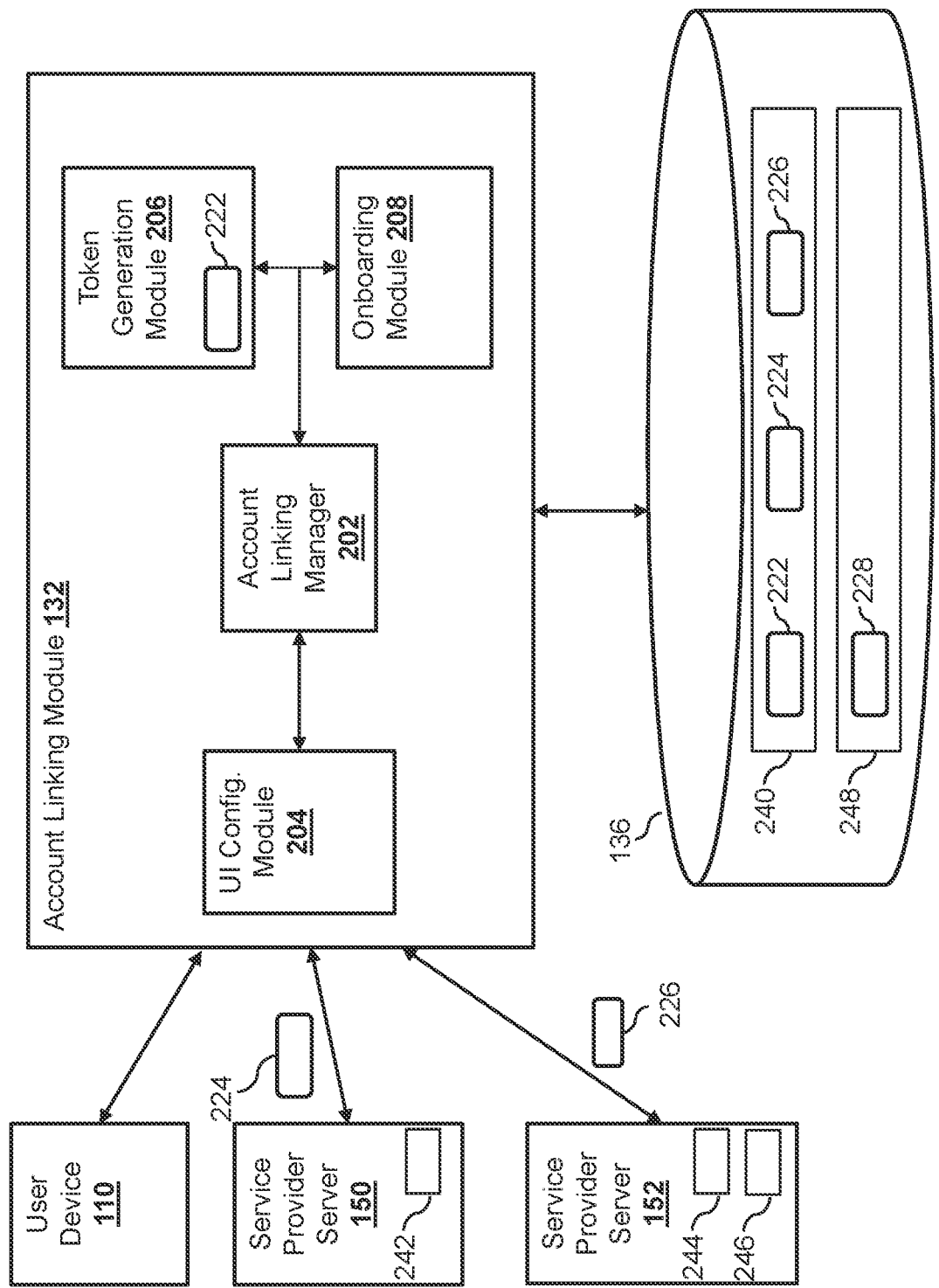
FIG. 2 is a block diagram illustrating an account linking module according to an embodiment of the present disclosure.

FIG. 2 illustrates an example of the account linking module 132 according to an embodiment of the disclosure. The account linking module 132 may include an account linking manager 202, a user interface (UI) configuration module 204, a token generation module 206, and an onboarding module 208. The account linking module 132 may be communicatively coupled to the account database 136. As discussed above, the account database 136 may store data associated with one or more user accounts created with the service provider server 130. For example, the user 140 may create, through a registration process, a user account (e.g., a user account 240) with the service provider server 130. Thus, the account database may store data associated with the user account 240.

In some embodiments, the account linking module 132 may implement at least some of the functionalities of the account linking system disclosed herein. For example, the account linking module 132 may perform two-way onboarding and linking of accounts across multiple service providers for a user. Through the account linking module 132, accounts with different service providers may be linked, which enable the user to access the data and functionalities of the different accounts by logging in to only one of the accounts and via a common user interface (e.g., the user interface of the account to which the user logged in).

In some embodiments, the account linking manager 202 may use the UI configuration module 204 to configure the user interface provided by the interface server 134 to enable the user to create another user account with another service provider server (e.g., the service provider server 150 and/or the service provider server 152). For example, the UI configuration module 204 may configure the user interface of the service provider server 130 to include a selectable interface element (e.g., a button) for initiating the registration process of a new user account with the service provider server 150 or 152. Upon receiving a selection of the selectable interface element (e.g., for creating a new account with the service provider server 150), the onboarding module 208 may transmit a request to the service provider server 150 for creating a new user account (e.g., an onboarding request), and may redirect the user 140 from the user interface of the service provider server 130 to a user interface associated with the service provider server 150 (e.g., redirecting from a website of the service provider server 130 to a website of the service provider server 150).

In some embodiments, the onboarding module 208 may also transmit, in addition to the request or as part of the request, at least a portion of information associated with the user account 240 of the user 140 with the service provider server 130 (e.g., name, age, gender, address, and other information that is common across multiple different accounts) to the service provider server 150. Thus, the service provider server 150 may use the received information to either skip (e.g., bypass) one or more sub-processes of the registration process or prefill at least a portion of the registration interface, such that the user 140 is not burdened with providing the same information that he or she provided to other service providers during the registration process.

Once the user account (e.g., a user account 242) with the service provider server 150 is created, the account linking manager 202 may link the user account 242 (with the service provider server 150) to the user account 240 (with the service provider server 130). In some embodiments, the account linking manager 202 may use the token generation module 206 to generate an access token (e.g., an access token 222) for accessing the user account 240 with the service provider server 130. The account linking manager 202 may transmit the access token 222 to the service provider server 150 to enable the service provider server 150 to access the user account 240. In return, the account linking manager 202 may receive an access token (e.g., an access token 224) from the service provider server 150 for accessing the user account 242 with the service provider server 150. Using the received access token 224, the account linking manager 202 may then provide, via the user interface provided by the service provider server 130, the user 140 access to the user account 242 without requiring the user 140 to log in (e.g., providing the corresponding credential) to the user account 242.

Figure 3:
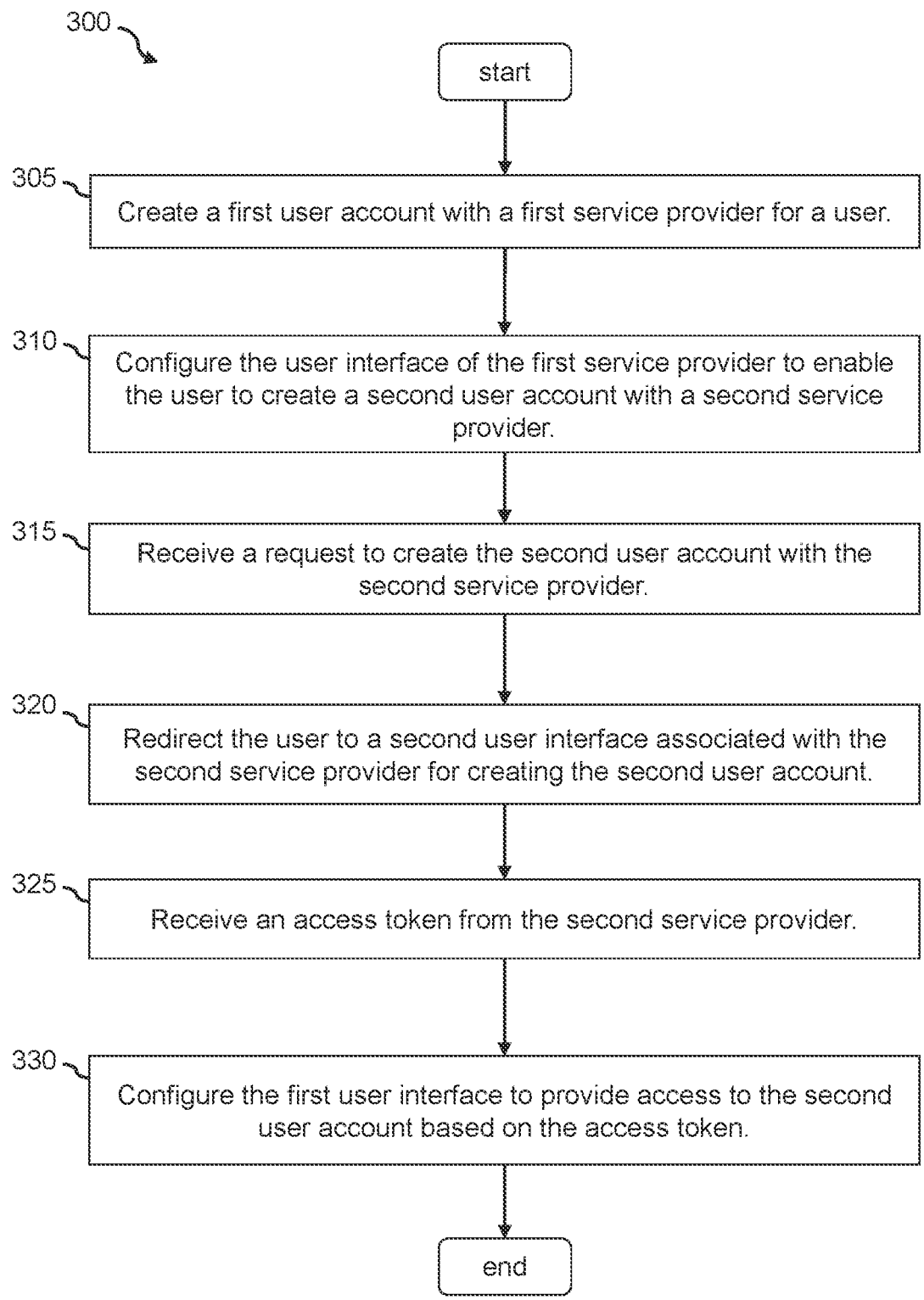
FIG. 3 is a flowchart showing a process of two-way user account onboarding and linking according to an embodiment of the present disclosure.
Figure 4:
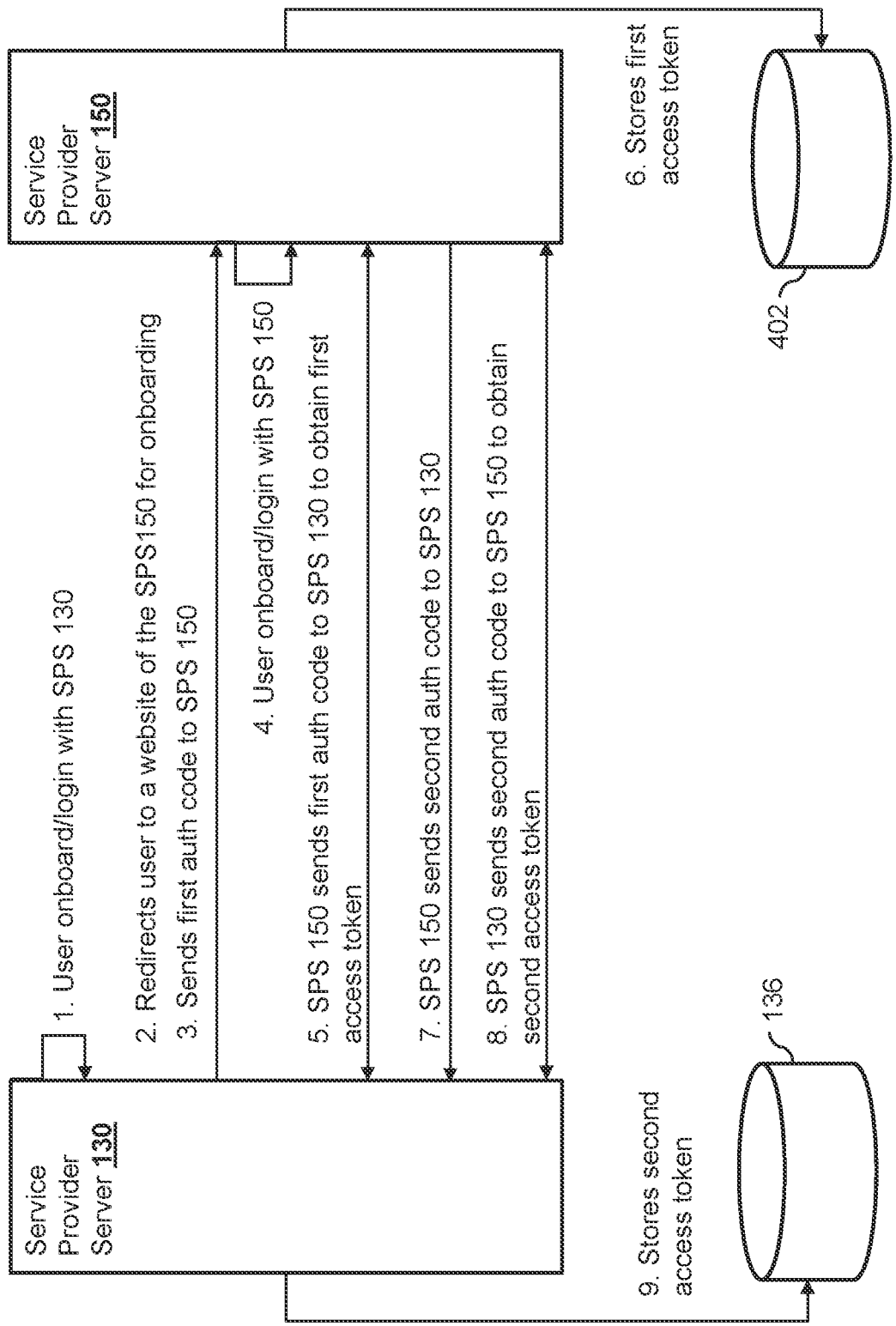
FIG. 4 illustrates an implementation of access token exchange between two service provider servers according to an embodiment of the present disclosure.

FIG. 3 illustrates a process 300 for performing two-way account onboarding and linking across multiple service providers according to an embodiment of the disclosure. In some embodiments, the process 300 may be performed by the account linking module 132 and interface server 134 of the service provider server 130. The process 300 begins with creating (at step 305) a first user account with a first service provider for a user. Referring to FIG. 4, the service provider server 130 first performs a user onboarding process (step 1). For example, as discussed above, the service provider server 130 may provide a registration interface, through the interface server 134, on the user device 110 that enables the user 140 to register a user account with the service provider server 130. Through the registration interface provided by the service provider server 130, the user 140 may create a user account with the service provider server 130 by providing information such as a name, an age, a gender, an address, a bank account number, and other information required by the service provider server 130 to perform electronic transactions for the user 140. Upon completion of the registration process (e.g., the user provided all of the required information for creating a new user account), the service provider server 130 may create a user account (e.g., the user account 240) for the user 140 by storing data (including the information provided by the user 140 during the registration process) associated with the user account 240 in the account database 136. The service provider server 130 may also associate a credential (e.g., a password, a biometric, etc.) with the user account 240 for the user 140 to log in to the user account 240. Thus, the user may log in to the user account 240 with the service provider server 130 using the credential associated with the user account 240.

Once the service provider server 130 has established the user account 240 for the user 140, the service provider server 130 may begin providing services to the user 140. For example, after the user 140 logs in to the user account 240 using the credential, the interface server 134 may provide, on the user device 110 of the user 140, a user interface (e.g., a home webpage of the user account 240, etc.) that enables the user to access the first user account. Through the user interface, the user may view data (e.g., user data, transaction data, activity data, etc.) associated with the user account 240. The user 140 may also initiate transaction requests (e.g., a funds transfer request, a payment request, etc.) through the user account 240 via the user interface (e.g., selecting different selectable interface elements presented on the user interface). For example, the user 140 may request to perform a payment transaction for a purchase with a merchant or request to transfer funds from the user account 240 to another user account of another person with the service provider server 130. Upon receiving a transaction request via the user interface, the service application may perform the transaction using the user account 240. The transaction data may be stored as a record in association with the user account 240 (e.g., in the account database 136), which can be viewed subsequently by the user 140 via the user interface.

The process 300 then configures (at step 310) the user interface of the first service provider to enable the user to create a second user account with a second service provider. As discussed herein, the account linking module 132 may perform two-way account onboarding for the user. For example, the account linking module 132 may configure the user interface provided by the service provider server 130 to enable the user 140 to initiate a registration of a user account with a different service provider server (e.g., the service provider server 150, the service provider server 152, etc.). For example, the UI configuration module 204 may present, on the user interface provided by the service provider server 130, a selectable interface element (e.g., a button) for initiating a registration of a new user account with any one of the service provider servers 150 and 152.

The process 300 then receives (at step 315) a request to create the second user account with the second service provider and redirects (at step 320) the user to a second user interface associated with the second service provider for creating the second user account. When the service provider server 130 determines that the user 140 has selected the selectable interface element via the user interface, the onboarding module 208 may transmit a request (e.g., an onboarding request) to the service provider server corresponding to the selectable interface element (e.g., the service provider server 150) for creating a new user account with the service provider server 150. Referring to FIG. 4, the onboarding module 208 may also redirect the user to a user interface associated with the service provider server 150 (e.g., a registration webpage of the service provider server 150) to create a new user account (step 2).

In some embodiments, the onboarding module 208 may also transmit, in addition to the onboarding request or as part of the onboarding request, at least a portion of information associated with the user account 240 (e.g., name, age, gender, address, and other information that is universal across different user accounts stored in the account database 136) to the service provider server 150. Thus, the service provider server 150 may use the received information to either skip (e.g., bypass) one or more sub-processes of the registration process or prefill at least a portion of the registration interface associated with the service provider server 150, such that the user 140 is not required to provide information to the service provider server that he or she has already provided to the service provider server 130.

Referring to FIG. 4, the onboarding module 208 may also transmit, to the service provider server 150, an authorization code associated with user account 240 and a state parameter (step 3). The authorization code may be generated to allow the service provider server 150 to retrieve an access token from the service provider server 130 once the new user account with the service provider server 150 is created. The state parameter indicates a state of the onboarding process, such that when the user is redirected back to the user interface of the service provider server 130 (e.g., the website associated with the service provider server 130), the account linking module 132 may determine that the user has just finished creating the user account with the service provider server 150 based on the state parameter received from the service provider server 150.

In some embodiments, the service provider server 150 may process the onboarding request by creating a user account (e.g., the user account 242) based on the information received from the service provider server 130 and the information provided by the user 140 through the registration interface of the service provider server 150 (step 4 in FIG. 4). The service provider server 150 may also associate a credential (e.g., a password, a biometric, etc.) with the user account 242. In some embodiments, the credential associated with the user account 242 may be different from the credential associated with the user account 240 (e.g., different passwords, fingerprint instead of iris scan, etc.).

Once the registration process of the service provider server 150 is complete, the service provider server 150 may redirect the user 140 back to the user interface provided by the service provider server 130 (e.g., the homepage of the user account 240 with the service provider server 130). The service provider server 150 may include, in the redirect, the authorization code and the state parameter generated by the service provider server 130 (step 5 in FIG. 4). Based on the state parameter, the account linking manager 202 may determine that the user has just created the new user account with the service provider 150. The account linking manager 202 may also validate the authorization code by determining that the authorization code received from the service provider server 150 matches the authorization code generated by the accounts linking manager and included in the redirect request to the service provider server 150. Upon validating the authorization code, the account linking manager 202 may use the token generation module 206 to generate an access token (e.g., the access token 222) for accessing the user account 240 with the service provider server 130.

In some embodiments, the token generation module 206 may generate the access token 222 based on an identifier (e.g., an account number, a user name, etc.) and/or a credential (e.g., a password, a biometric, etc.) associated with the user account 240. For example, the access token 222 may be a hash value generated based on hashing the identifier and/or the credential. In another example, the first account access token is generated by encrypting the identifier and/or the credential using one or more encryption algorithms. The account linking manager 202 may transmit the access token 222 to the service provider server 150 (step 5 in FIG. 4). The service provider server 150 may store (step 6 in FIG. 4) the access token 222 in a non-transitory storage (e.g., a non-transitory storage 402). In some embodiments, the service provider server 150 may associate the access token 222 with the user account 242, such that when the user 140 logs in to the user account 242 with the service provider server 150, the service provider server 150 may retrieve the access token 242 for accessing the user account 240 with the service provider server 130.

Using the access token 222 provided by the service provider server 130, the service provider server 150 may provide the user 140 access to the user account 240 (e.g., data and functions associated with the user account 240) based on the user 140 logging in to the user account 242. For example, the account linking module 132 may receive (e.g., through the interface server 134), from the service provider server 150, a request for accessing the user account 240 (e.g., via an application programming interface (API) call associated with the accounts linking module 132). The request may include a request for accessing the data associated with the user account 240 (e.g., historic transaction data, profile data, etc.), a request for accessing a function that the user 140 may initiate through the user account 240 with the service provider 130, or any other type of request related to the user account 240.

Upon receiving the request, the account linking manager 202 may determine whether the request includes an access token generated by the token generation module 206 for the user account 240. For example, in some embodiments, the account linking manager 202 may compare the access token included in the request against the access token 222 to determine if the access token included in the request matches the access token 222. In some embodiments, the account linking module 202 may also extract information from the access token included in the request to determine if it includes the correct credential(s) for accessing the user account 240. As discussed above, the access token 222 may be generated based on the identifier and/or the credentials (e.g., the password) of the user account 240. Thus, the account linking manager 202 may extract the identifier and/or the credential from the access token included in the request from the service provider server 150, and determine that the identifier and/or the credential extracted from the received token matches the identifier and/or the credential associated with the user account 240. If it is determined that the received access token matches the generated access token 222 and/or that the identifier and/or the credential extracted from the received token match the identifier and/or the credential associated with the user account 240, the account linking manager 202 may provide the service provider server 150 access to the user account 240. As such, the service provider server 150 may enable, via the user interface provided by the service provider server 150 (e.g., a website of the service provider server 150), the user 140 to access the data and function(s) associated with the user account 240, without requiring the user 140 to separately log in to the user account 240 with the service provider server 130.

In one example, the service provider server 130 may be an electronic payment transaction platform, and may provide the user 140 access to a funding account having a monetary balance. The service provider server 130 may also provide transaction services (e.g., electronic payment services, funds transfer services, etc.) for the user 140 using the funding account. Based on the request (and the access token included in the request) received from the service provider server 150, the accounts linking manager 202 may provide account details of the user account 240, such as a current account balance of the funding account and/or transaction history of the funding account (e.g., information associated with transactions performed by the user 140 such as payment transactions, funds transfer transactions, through the user account 240, etc.). In some embodiments, the service provider server 130 may also communicate (e.g., in response to a request) to the service provider server 150 a set of functions (e.g., performing payment transactions to a payee using the user account 240, performing funds transfer transactions from the user account 240 to another user account, etc.) that the user 140 may perform through the user account 240. Based on such a communication, the service provider server 150 may configure its user interface (e.g., the website of the service provider server 150) to enable the user 140 to initiate one or more of the functions with the user account 240. Thus, not only can the user 140 access data associated with the user account 240, the access token 222 enables the user 140 to perform functions (e.g., initiating transaction requests) associated with the user account 240 via the user interface provided by the service provider 150 without requiring the user 140 to separately log in to the user account 240.

For example, the account linking manager 202 may receive a request, from the service provider server 150, for initiating a payment transaction using the user account 240. By verifying that the request includes the access token 222 generated for the user account 240, the account linking manager may request the service application 138 to perform the payment request using the user account 240 without requiring the user 140 to log in to the user account 240 (e.g., without requiring the user to provide the user credential associated with the user account 240 to the service provider server 130).

Referring back to FIG. 3, the process 300 then receives (at step 325) an access token from the second service provider. For example, after creating the user account 242 for the user 140, the service provider server 150 may transmit an authorization code to the service provider server 130 (step 7 in FIG. 4). The service provider server 130 may use the authorization code to exchange for an access token (e.g., the access token 224) for accessing the user account 242 with the service provider server 150 (step 8 in FIG. 4). Thus, the account linking manager 202 may receive the access token 224 from the service provider server 150, and may store the access token 224 in the account database 136 (step 9 in FIG. 4). In some embodiments, the account linking manager 202 may associate the received access token 224 with the user account 240, such that when the user 140 accesses (e.g., logs in to) the user account 240 with the service provider server 130, the account linking manager 202 may retrieve the access token 224 from the account database 136 for accessing the user account 242 from the service provider server 150, without requiring the user 140 to log in to the user account 242 (e.g., providing the credential associated with the user account 242) with the service provider server 150.

After receiving the access token from the second service provider, the process 300 configures (at step 330) the first user interface to provide access to the second user account based on the access token. For example, the UI configuration module 204 may configure the user interface provided by the interface server 134 (e.g., a webpage provided by the interface server 134 such as a webpage for accessing the user account 240) to provide the user 140 access to the user account 242, such that the user 140 may access both of the user accounts 240 and 242 by logging in to the user account 240. In some embodiments, the account linking manager 202 may retrieve, from the service provider server 150, data associated with the user account 242 (e.g., by making a request via an API call associated with the service provider server 150). In one example, the service provider server 150 may be an online investment platform that enables the user 140 to use the user account 242 to access (e.g., buy, sell, trade, etc.) various investment products and services. As such, the user account 242 may be associated with a cash balance, and a portfolio including different investment products associated with the user account 242 (e.g., previously purchased by the user account 242) and their market values. Thus, the account linking manager 202 may retrieve the cash balance and the portfolio information from the service provider server 150 using the access token 242.

The account linking manager 202 may then use the UI configuration module 204 to present, on the user interface provided by the interface server 134, the retrieved data associated with the user account 242. In some embodiments, the UI configuration module may format the data associated with the user account 242 according to a data format associated with the user interface provided by the interface server 134 before presenting the data associated with the user account 242 on the user interface, such that the data associated with the user account 242 is presented in a consistent manner as the rest of the user interface (e.g., using the same format as the data associated with the user account 240).

In some embodiments, in addition to presenting the data associated with the user account 242, the account linking manager 202 may also determine a set of functions (e.g., transaction requests, etc.) that the user 140 may initiate through the user account 242 with the service provider server 150. For example, the account linking manger 202 may determine the set of functions through a set of API calls associated with the service provider server 150. In the example described above where the service provider server 150 is an online investment platform, the set of functions may include transferring funds (e.g., transferring funds from an external account such as a third-party bank account to the cash account such as a money market account of the user account 242, transferring funds from the cash account of the user account 242 to the third-party bank account, etc.), making a trade associated with an investment product (e.g., buying, selling, trading, etc.), and other functions associated with the investment platform.

The UI configuration module 204 may then present, on the user interface provided by the interface server 134, one or more selectable interface elements for initiating the set of functions associated with the user account 242 (e.g., funds transfer, trading, etc.). When the account linking manager 202 detects that one of the one or more selectable interface elements is selected by the user 140, the account linking manager may transmit, to the service provider server 150, a request for performing the corresponding function for the user account 242, and may include the access token 224 in the request. The service provider server 150 may perform the corresponding function for the user account 242 based on the request and the access token 224 included in the request. Thus, the user 140 may access the user account 240 (e.g., the data and functions associated with the user account 240) and the user account 242 (e.g., the data and functions associated with the user account 242) via the user interface provided by the service provider server 130 by logging only in to the user account 240 with the service provider 130, without separately logging in to the user account 242 with the service provider server 150.

After the user account 240 is linked with the user account 242 using the token exchange mechanism described herein, the account linking manager 202 may also determine additional functions that the user 140 may initiate. For example, the additional functions may correspond to transactions that involve both of the user account 240 and the user account 242, such as a funds transfer transaction between the user accounts 240 and 242 or performing a trade of an investment product through the user account 242 using funds from the user account 240. The UI configuration module 204 may then present, on the user interface provided by the service provider server 130, additional selectable interface elements for initiating the additional functions. Thus, by logging in to the user account 240 (and without logging in to the user account 242), the user may initiate a transaction that involves both the user account 240 and the user account 242 (e.g., transferring funds from the user account 242 to the user account 240, etc.) via the user interface provided by the service provider server 130. For example, the user may initiate a purchase transaction of an investment product (e.g., a stock) through the user account 242 using funds from the user account 240 by selecting one of the additional selectable interface elements. Upon detecting a selection of the selectable interface element, the account linking manager 202 may initiate two separate transactions to process the request—(1) a first transaction to transfer the funds from the user account 240 to the user account 242 and (2) a second transaction to process the purchase of the investment product using the user account 242. To initiate the second transaction, the account linking manager 202 may transmit, to the service provider server 150, a request for purchasing the investment product, and may include the access token 224 in the request. Based on the access token 224, the service provider server 150 may perform the transaction (e.g., the purchase of the investment product) using the user account 242. When a transaction associated with the user account 242 is complete, the account linking manager 202 may use the access token 224 to retrieve updated account data associated with the user account 242 from the service provider server 150, and may then use the UI configuration module 204 to present the updated account data of the user account 242.

Using the token exchange techniques described herein, the account linking module 132 may link the user account with multiple accounts with different service providers. Furthermore, the two-way account linking process can be performed to link the user account 240 with an existing user account (e.g., without requiring the user to create a new account with the other service provider). For example, the user 140 may have an established user account (e.g., a user account 244) with the service provider server 152. The user 140 may request the account linking module 132 to link the user account 240 with the user account 244. Thus, the account linking manager 202 may perform the two-way account linking process by exchanging the access token 222 (for accessing the user account 240) with an access token 226 from the service provider server 152, for accessing the user account 244. The account linking manager 202 may also store the access token 226 in the account database 136, in association with the user account 240. After the user account 240 is linked with the user account 244 (through the exchange of access tokens with the service provider server 152), the UI configuration module 204 may provide, via the user interface provided by the service provider server 130, the user 140 access to the user account 240, the user account 242 with the service provider 150, and the user account 244 with the service provider 152 (e.g., by presenting data associated with the user account 244 and enabling the user 140 to initiate functions associated with the user account 244) by using the access tokens 224 and 226.

In addition, based on the linking of the user accounts 242 and 244, the account linking manager may determine additional functions (e.g., transactions) that involve the user accounts 240, 242, and/or 244, such as a funds transfer transaction between the user account 242 and the user account 244 or performing a trade transaction through the user account 242 using funds from the user account 244. In such a scenario, even though the service provider server 130 is not associated with either the user account 242 or the user account 244, the service provider server 130 may use the access tokens 224 and 226 to facilitate the transactions between the user accounts 242 and 244. For example, the UI configuration module 204 may present, on the user interface provided by the service provider server 130, additional selectable interface elements for initiating the additional functions that involve the user accounts 242 and 244. Thus, by logging in to the user account 240 (and without logging in to the user account 242 and/or the user account 244), the user 140 may initiate a transaction that involves the user account 240, the user account 242 and/or the user account 244 via the user interface provided by the service provider server 130.

For example, the user 140 may initiate a funds transfer transaction for transferring funds from the user account 244 to the user account 242. In this example, the user account 244 may be associated with a funding account such as a bank checking account. Upon detecting a selection of the selectable interface element corresponding to the transaction that involves the user accounts 242 and 244, the account linking manager 202 may initiate two separate transactions to process the request—(1) a first transaction to transfer the funds from the user account 244 to the user account 240 and (2) a second transaction to transfer the funds from the user account 240 to the user account 242. To initiate the first transaction, the account linking manager 202 may transmit, to the service provider 152, a request for transferring the funds from the user account 244 to the user account 240, and may include the access token 226 in the request. Upon receiving the request for transferring the funds, the service provider server 152 may perform the funds transfer request using the user account 244 based on the access token 226 included in the request. To initiate the second transaction, the account linking manager 202 may use the service application 138 to transfer the funds from the user account 240 to the user account 242. When the two transactions are completed, the account linking manager 202 may use the access tokens 224 and 226 to retrieve updated account data associated with the user accounts 242 and 244 from the service provider servers 150 and 152, respectively, and may then use the UI configuration module 204 to present the updated account data of the user accounts 242 and 244.

In another example, the user 140 may initiate a trade transaction for purchasing an investment product through the user account 242 using funds from the user account 244. In this example, the user account 244 may be associated with a funding account such as a bank checking account. Upon detecting a selection of the selectable interface element corresponding to the transaction that involves the user accounts 242 and 244, the account linking manager 202 may initiate two separate transactions to process the request—(1) a first transaction to transfer the funds from the user account 244 to the user account 242 and (2) a second transaction to process the purchase of the investment product using the user account 242. To initiate the first transaction, the account linking manager 202 may transmit, to the service provider 152, a request for transferring the funds from the user account 244 to the user account 242, and may include the access token 226 in the request. Upon receiving the request for transferring the funds, the service provider server 152 may perform the funds transfer request using the user account 244 based on the access token 226 included in the request. To initiate the second transaction, the account linking manager 202 may transmit, to the service provider server 150, a request for purchasing the investment product, and may include the access token 224 in the request. Based on the access token 224, the service provider server 150 may perform the transaction (e.g., the purchase of the investment product) using the user account 242. When the two transactions are completed, the account linking manager 202 may use the access tokens 224 and 226 to retrieve updated account data associated with the user accounts 242 and 244 from the service provider servers 150 and 152, respectively, and may then use the UI configuration module 204 to present the updated account data of the user accounts 242 and 244.

Figure 5:
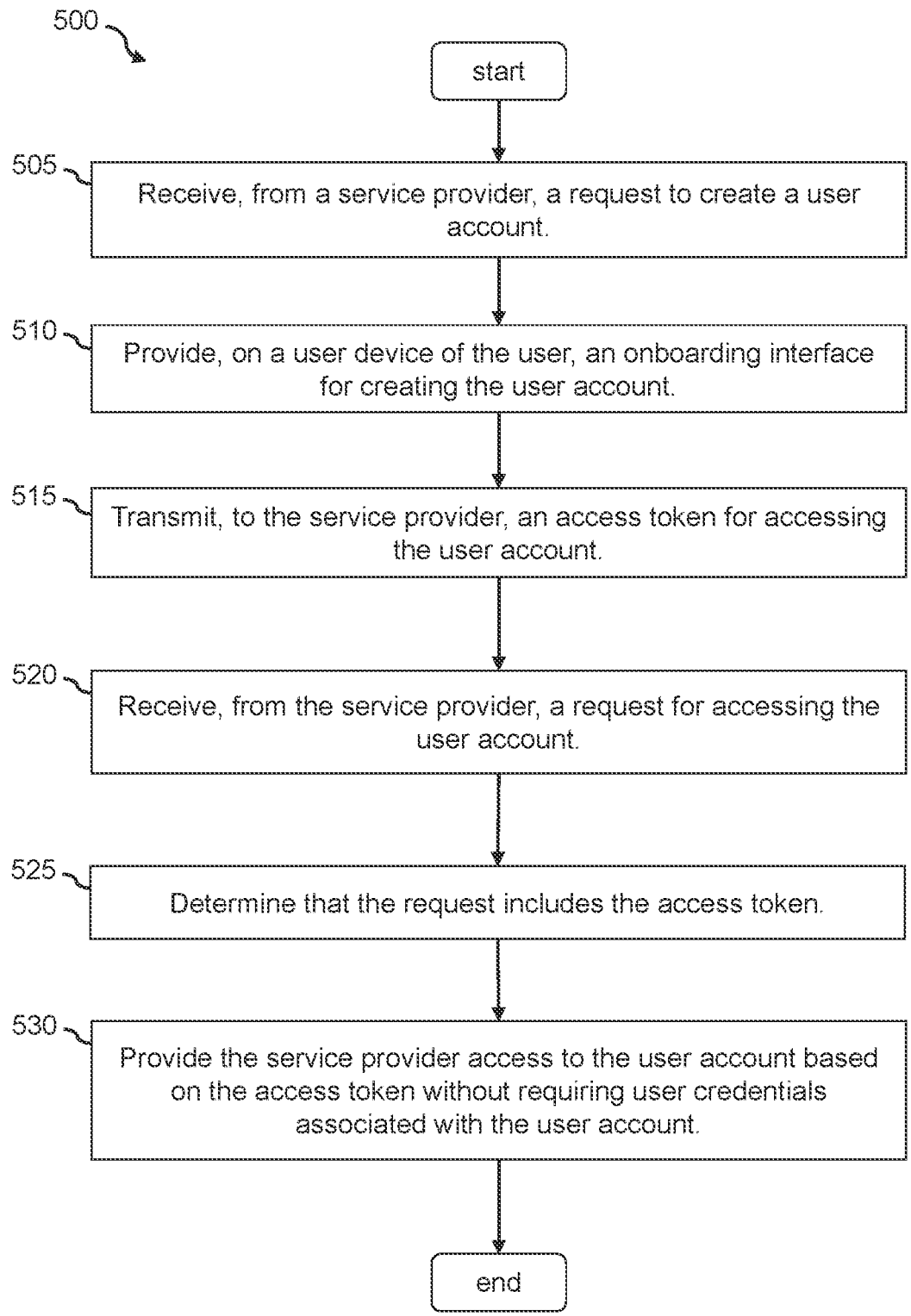
FIG. 5 is a flowchart showing a process of processing a two-way user account onboarding and linking request according to an embodiment of the present disclosure.

In some embodiments, instead of initiating the two-way onboarding and linking process, the service provider server 130 may receive a two-way onboarding and linking request from another service provider (e.g., the service provider server 150, the service provider server 152, etc.). FIG. 5 illustrates a process 500 for processing a two-way onboarding and linking request according to an embodiment of the disclosure. In some embodiments, the process 500 may be performed by the account linking module 132 and the interface server 134. In some embodiments, this process 500 may also be performed by the service provider server 150 when the service provider server 150 receives the request to create the user account for the user 140 at the step 320 of FIG. 3. The process 500 begins by receiving (at step 505), from a service provider, a request to create a user account. For example, the service provider server 130 may receive a request, from the service provider server 152, for creating a new user account for another user.

The process 500 then provides (at step 510), on a user device of the user, an onboarding interface for creating the user account. For example, in response to receiving the request, the interface server 134 may provide a user account registration interface (e.g., a registration webpage of the service provider server 130) on a user device of the user. The user account registration interface may prompt the user for information for creating the user account. In some embodiments, the user may already have an existing user account (e.g., the user account 246) with the service provider server 152, and the request comprises a redirect request that redirects the user from the homepage of the user account 246 to the service provider server 130. Furthermore, the service provider server 152 may also include, in the request, at least a portion of data associated with the user account 246 (e.g., a name, a gender, an age, an address, and other data that might be common across multiple types of accounts), such that the service provider server 130 may use the portion of data received from the service provider server 152 for creating a new user account (e.g., a user account 248). The interface server 134 may use the received information to eliminate one or more sub-processes of the registration process and/or pre-fill a portion of the registration interface.

The process 500 then transmits (at step 515), to the service provider, an access token for accessing the user account. For example, the service provider server 130 may also request the token generation module 206 of the account linking module 132 to generate an access token (e.g., an access token 228) for accessing the user account 248. When the registration process for creating the user account 248 is complete, the interface server 134 may redirect the user back to the user interface of the service provider server 152 (e.g., the homepage of the user account 246). The interface server 134 may also transmit the access token 228 generated by the token generation module 206 to the service provider server 152, such that the service provider server 152 may access the user account 248 using the access token 228 without requiring the user to log in to the user account 248. In some embodiments, the account linking module 132 may also receive, from the service provider server 152, an access token for accessing the user account 246 with the service provider server 152. After the exchange of access tokens, the account linking module 132 may provide the user access to the data and functions associated with the user account 246.

The process 500 then receives (at step 520), from the service provider, a request for accessing the user account. For example, the account linking module 132 may receive, from the service provider server 152, a request to access the user account 248. The request may include a request for data associated with the user account 248. The request may also include a request for performing a transaction (e.g., a payment transaction a fund transfer transaction, etc.) using the user account 248. Upon receiving the request, the process 500 determines (at step 525) that the request includes the access token and provides (at step 530) the service provider access to the user account based on the access token without requiring user credentials associated with the user account. For example, the account linking manager 202 may determine whether the access token included in the request matches the access token 228 generated for the user account 248. If the account linking manager 202 determines that the access token included in the request does not match the access token 228, the account linking manager 202 may deny the request to access the user account 248. On the other hand, if the account linking manager 202 determines that the access token included in the request matches the access token 228, the account linking manager 202 may provide the service provider server 152 access to the user account 248. For example, if the request is a request for data associated with the user account 248, the account linking manager 202 may transmit, to the service provider server 152, data associated with the user account 248, such as a current account balance, transaction history data, etc. If the request is a request for performing a transaction (e.g., a payment transaction, a fund transfer transaction, etc.), the account linking manager 202 may use the service application 138 to perform the requested transaction based on the user account 248. This way, the user can log in to another account with another service provider server (e.g., the user account 246 with the service provider server 152) to access the data and functionality of the user account 248 with the service provider server 130 using the access token 228.

Figure 6:
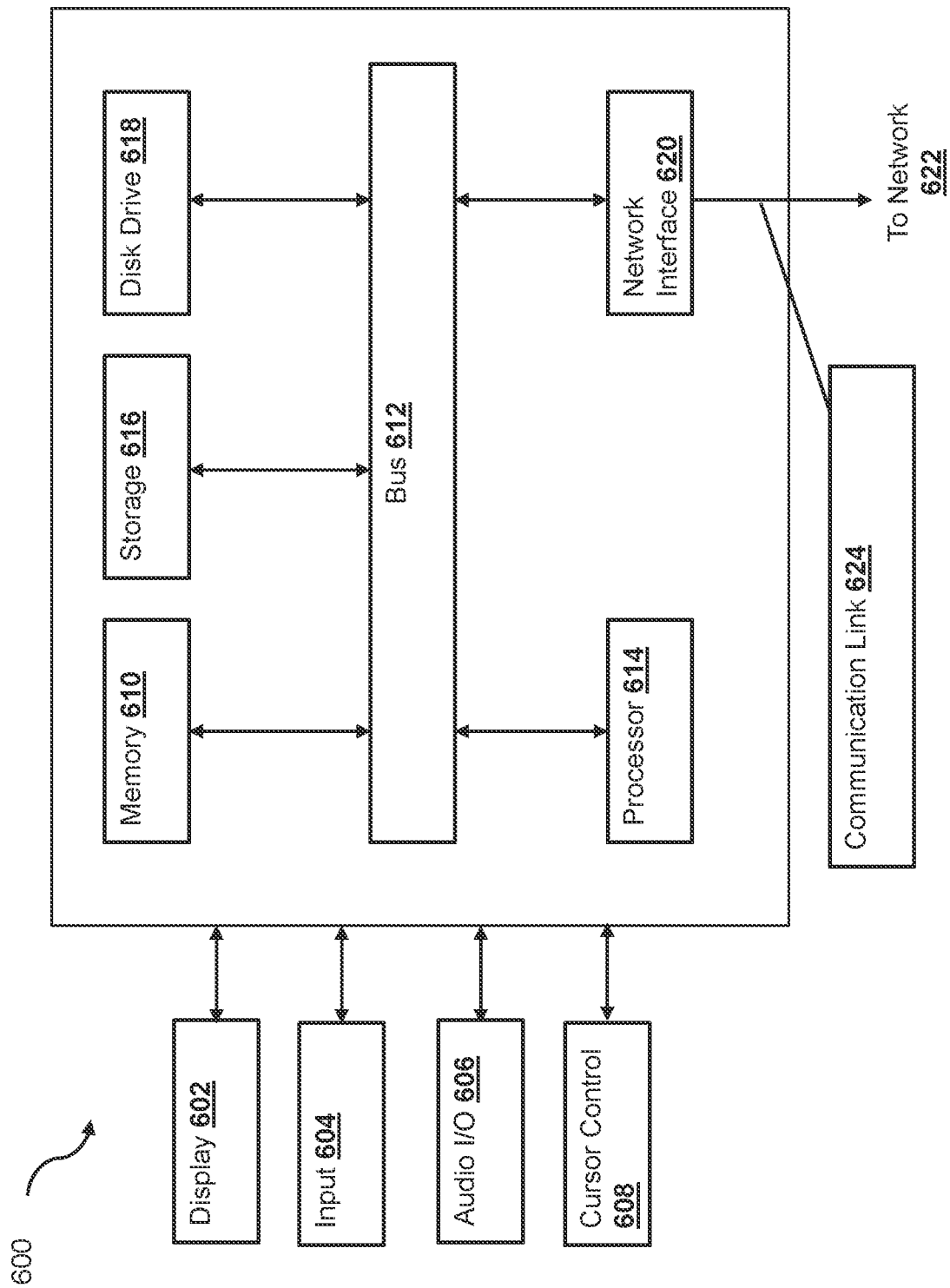
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the service provider server 150, the service provider server 152, and the user device 110. In various implementations, the user device 110 may include a mobile cellular phone, personal computer (PC), laptop, wearable computing device, etc. adapted for wireless communication, and each of the service provider servers 130, 150, and 152 may include a network computing device, such as a server. Thus, it should be appreciated that the devices 130, 150, 152, and 110 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, or another service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the two-way accounts onboarding and linking functionalities described herein according to the processes 300 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system of a first service provider, comprising:
a non-transitory memory; and
one or more hardware processors coupled with the non-transitory memory and configured to read instructions from the non-transitory memory to cause the system to perform operations comprising:
providing, on a user device of a user, a user interface in association with a first user account with the first service provider based on an account identifier associated with the first user account, wherein the user interface includes first data associated with a first function that is executable by a first server of the first service provider and accessible by the user via the user interface;
determining that the first user account is linked to a second user account with a second service provider based on a second user account access token stored in a data storage in association with the first user account;
without requiring the user to log in to the second user account with the second service provider:
retrieving, using the second user account access token and through an application programming interface (API) of the second service provider from a server associated with the second service provider, information related to a second function associated with the second user account and executable by the second server associated with the second service provider;
determining, based on the information related to the second function, a composite function that combines the first function and the second function; and
modifying the user interface provided on the user device, wherein the modifying comprises adding second data associated with the composite function to the user interface;
in response to receiving a request to perform the composite function via the user interface, performing the composite function by (i) transmitting one or more API calls and the second user account access token to the second server associated with the second service provider for executing the second function, and (ii) executing the first function;
generating, from the second server, a response based on the performing the composite function;
formatting the response according to a format associated with the user interface; and
presenting, on the user interface, the formatted response indicating the performing the composite function.

2. The system of claim 1, wherein the operations further comprise:
receiving, from the second server, a data access request for accessing user data associated with the first user account with the first service provider;
determining that the data access request comprises a first user account access token associated with the first user account; and
in response to determining that the data access request comprises the first user account access token, transmitting the user data to the second server.

3. The system of claim 2, wherein the operations further comprise:
generating the first user account access token for the first user account; and
transmitting the first user account access token to the second server.

4. The system of claim 1, wherein first user data associated with the first user account is stored on the first server, and wherein the operations further comprise:
without requiring the user to log in to the second user account with the second service provider, retrieving, using the second user account access token and through the API of the second service provider from the second server, second user data associated with the second user account with the second service provider;
formatting the second user data according to the format associated with the user interface; and
presenting the first user data and the formatted second user data together on the user interface.

5. The system of claim 4, wherein the first user data is associated with a first set of transactions processed by the first server through the first user account, and wherein the second user data is associated with a second set of transactions processed by the second server through the second user account.

6. The system of claim 5, wherein the response indicates a status of the purchase transaction.

7. The system of claim 1, wherein the first function is associated with transferring funds from the first user account to the second user account, and wherein the second function is associated with processing a purchase transaction through the second user account using the funds transferred to the second user account from the first user account.

8. A method, comprising:
in response to receiving a login credential associated with a first account with a first service provider, providing, on a user device of a user, a user interface presenting first data associated with the first account, wherein the first data comprises a first function that is executable by a first server of the first service provider and accessible by the user via the user interface;
determining, by the first server, that a second account access token associated with a second account with a second service provider is linked to the first account;
without requiring the user to log in to the second account with the second service provider:
retrieving, using the second account access token and through an application programming interface (API) of the second service provider from a second server associated with the second service provider, information related to a second function associated with the second account and executable by the second server associated with the second service provider;
determining, based on the information related to the second function, a composite function that combines the first function and the second function; and
modifying, by the first server, the user interface provided on the user device, wherein the modifying comprises adding second data comprising the composite function to the user interface;
in response to receiving a request to perform the composite function via the user interface, performing, by the first server, the composite function by (i) executing the first function through the first account and (ii) transmitting one or more API calls and the second account access token to the second server associated with the second service provider for executing the second function through the second account based on first user data associated with the first account;
generating, from the second server, a response based on the performing the composite function;
formatting the response according to a format associated with the user interface; and
presenting, by the first server and on the user interface, the formatted data indicating the performing the composite function.

9. The method of claim 8, wherein a second login credential associated with the second account is embedded within the second user account access token.

10. The method of claim 8, wherein the first user data is generated based on the executing the first function through the first user account.

11. The method of claim 8, further comprising:
receiving, from the second server, a data access request for accessing first activity data associated with the first account;
determining that the data access request comprises a first account access token associated with the first account; and
in response to determining that the data access request comprises the first account access token, transmitting the first activity data to the second server.

12. The method of claim 11, further comprising:
extracting credential information from the first account access token; and
determining that the credential information corresponds to the login credential associated with the first account, wherein the transmitting the second user data to the second server is further responsive to the determining that the credential information corresponds to the login credential.

13. The method of claim 8, wherein the first account is associated with first activity data representing a first plurality of transactions conducted through the first account, wherein the method further comprises:
without requiring the user to log in to the second account with the second service provider, retrieving, using the second account access token and through the API of the second service provider from the second server, second activity data representing a second plurality of transactions conducted through the second account with the second service provider; and
presenting the first activity data and the second activity data together on the user interface.

14. The method of claim 13, further comprising:
formatting the second activity data according to the format associated with the user interface before presenting the second activity data on the user interface.

15. A non-transitory machine-readable medium having stored thereon machine-readable instructions executable to cause a machine associated with a first service provider to perform operations comprising:
providing, on a user device of a user, a user interface in association with a first account with the first service provider based on a login credential received via the user device, wherein the user interface includes first data associated with a first function that is executable by a first server of the first service provider and accessible by the user via the user interface;
determining that the first account is linked to a second account with a second service provider based on a second account access token stored in a data storage in association with the first account;
without requiring the user to log in to the second account with the second service provider:
retrieving, using the second account access token and through an application programming interface (API) of the second service provider from a second server associated with the second service provider, information related to a second function associated with the second user account and executable by the second server associated with the second service provider;
determining, based on the information related to the second function, a composite function that combines the first function and the second function; and
modifying the user interface provided on the user device, wherein the modifying comprises adding second data associated with the composite function to the user interface;
in response to receiving a request to perform the composite function via the user interface, performing the composite function by (i) executing the first function through the first account and (ii) transmitting one or more API calls and the second account access token to the second server associated with the second service provider for executing the second function through the second account based on first user data associated with the first account;
obtaining, from the second server, a response based on the performing the composite function;
formatting the response according to a format associated with the user interface; and presenting, on the user interface, the formatted response as an indication of the performing the composite function.

16. The non-transitory machine-readable medium of claim 15, wherein the first user data is generated based on the executing the first function through the first user account.

17. The non-transitory machine-readable medium of claim 15, wherein the operations further comprise:
receiving, from the second server, a data access request for accessing first transaction data associated with the first account;
determining that the data access request comprises a first account access token associated with the first account; and
in response to determining that the data access request comprises the first account access token, transmitting the first transaction data to the second server.

18. The non-transitory machine-readable medium of claim 17, wherein the operations further comprise:
extracting credential information from the first account access token; and
determining that the credential information corresponds to the login credential associated with the first account, wherein the transmitting the second user data to the second server is further responsive to the determining that the credential information corresponds to the login credential.

19. The non-transitory machine-readable medium of claim 15, wherein the first account is associated with first activity data representing a first plurality of transactions conducted through the first account, wherein the operations further comprise:
without requiring the user to log in to the second account with the second service provider, retrieving, using the second account access token and through the API of the second service provider from the second server, second activity data representing a second plurality of transactions conducted through the second account with the second service provider; and
presenting the first activity data and the second activity data together on the user interface.

20. The non-transitory machine-readable medium of claim 19, wherein the operations further comprise:
formatting the second activity data according to the format associated with the user interface before presenting the second activity data on the user interface.

* * * * *